United States Patent [19]

Hait

[11] 4,209,035
[45] Jun. 24, 1980

[54] ROTARY IRRIGATION SYSTEM

[76] Inventor: James M. Hait, 6154 Montgomery Pl., San Jose, Calif.

[21] Appl. No.: 861,321

[22] Filed: Dec. 16, 1977

Related U.S. Application Data

[63] Continuation-in-part of Ser. No. 663,399, Mar. 3, 1976, abandoned.

[51] Int. Cl.$^2$ .................................................. B05B 3/12
[52] U.S. Cl. ...................................... 137/344; 239/177
[58] Field of Search ................. 137/344; 239/177, 212

[56] References Cited

U.S. PATENT DOCUMENTS

| | | |
|---|---|---|
| 1,419,925 | 6/1922 | Heine . |
| 2,892,466 | 6/1959 | Stilwell et al. |
| 3,259,319 | 7/1966 | Wallace . |
| 3,448,927 | 6/1969 | Blair .............................. 137/344 X |
| 3,536,261 | 10/1970 | Van Den Brink ................... 239/177 |
| 3,590,853 | 7/1971 | Haynes . |
| 3,606,161 | 9/1971 | Paul . |
| 3,692,045 | 9/1972 | Carr . |
| 3,730,211 | 5/1973 | de Laine et al. ....................... 137/344 |
| 3,897,801 | 8/1975 | Purtell ................................. 137/344 |

FOREIGN PATENT DOCUMENTS

| | | | |
|---|---|---|---|
| 264790 | 5/1965 | Australia .................................. 239/177 |
| 469086 | 8/1974 | Australia .................................. 239/177 |
| 1237665 | 6/1971 | United Kingdom ..................... 239/177 |

*Primary Examiner*—Gerald A. Michalsky
*Attorney, Agent, or Firm*—R. S. Kelly; F. W. Anderson

[57] ABSTRACT

A rotary irrigation system moves continuously across relatively large areas of land while the areas are being sprinkled. One end of a relatively long length of horizontal tubing is pivotally mounted to a vertical pipe containing water under pressure and the other end of the tubing is connected to a power mover. The tubing is provided with a plurality of sprinkling heads spaced throughout its length and is supported above the ground by a plurality of carriages so that the tubing can be used to irrigate an area of ground which is not completely flat. Each of the carriages is supported by a single wheel. A cable connected between the vertical pipe and the front end of the power mover causes the power mover to travel in a circle around the vertical pipe with the power mover providing an outward tension on both the cable and the tubing.

13 Claims, 12 Drawing Figures

FIG_1

FIG_2

FIG_3

FIG_10

FIG_9

FIG_11

ROTARY IRRIGATION SYSTEM

CROSS-REFERENCE TO RELATED APPLICATION

The present application is a continuation-in-part of my prior application, Ser. No. 663,399, filed Mar. 3, 1976, now abandoned.

BACKGROUND OF THE INVENTION

1. Field of the Invention

The present invention pertains to wheeled, movable irrigation systems and more particularly, it pertains to a rotary irrigation system which can be moved in a closed loop path to irrigate relatively large areas of land.

2. Description of the Prior Art

Typical irrigation systems include a ditch and furrow type of irrigation system, a flooding type of irrigation system. The flooding type and the ditch and furrow type of irrigation systems may be used where the fields are relatively level or have a gentle slope. The sprinkling type of irrigation may be used with land which does not lend itself to the other types of irrigation or where the cost of the other systems is relatively high. Sprinkling also has the advantage of causing less crusting of the soil, and, as a result, the water soaks into the soil faster and results in less evaporation of water than when flooding is used. In many areas of the world the sprinkling system is less expensive to build and to operate than the other type of irrigation systems.

Some prior art sprinkling systems include structures wherein the tubing is mounted on a plurality of wheels so that the tubing can be more readily moved from one section of the field to another. Even then it may be necessary to disconnect some of the sections of tubing so that they can be rolled across the field to a new area. Some of these prior art portable irrigation systems use small gasoline motors to supply power to the wheels so that the system can be moved from one portion of the field to another. One portable irrigation system which is arranged to be automatically moved on wheels by motors is shown in a prior U.S. Pat. No. 2,892,466 to Stilwell et al. This patent shows an irrigation system having relatively long lengths of pipe mounted through the hubs of wheels which are spaced at intervals along the pipe line to support the pipe above ground. A motor mounted on a carriage can be coupled to the wheels when the pipe is to be moved from one location to another. The motor causes the wheels supporting the pipe and the pipe to rotate so that the pipe moves across the ground. When the pipe is in the new location, the motor, which provides the power for moving the pipe, is disconnected prior to water being supplied to the pipe.

Other prior art sprinkling systems include structures wherein the tubing is mounted on a plurality of spaced carriages which are moved across the field by a water-powered motor as the field is sprinkled. One water-powered sprinkling system is shown in a prior U.S. Pat. No. 3,590,853 to Haynes. A single water-powered motor provides power to the wheels of each of the carriages to move a long length of pipe across the length of an area being irrigated. Another water-powered sprinkling system is shown in a prior U.S. Pat. No. 3,692,045 to Carr. The system shown in the Carr patent provides a separate water-powered motor for each of the carriages. When the apparatus shown in the Carr patent is connected so as to move in a circle about a central source of water it is very difficult to control the speed of each motor to keep the pipe from bending and being damaged. The carriage farthest from the central pivot point must have a velocity many times as great as the carriage nearest the central pivot point.

Another prior art portable sprinkler system is shown in a prior U.S. Pat. No. 3,536,261 to Van Den Brink. This system includes a standpipe connected to a pressurized water source, a length of sprinkler tubing with one end rotationally engaging the standpipe and with a tractor attached to the free end of the tubing. The tubing is supported above the ground by a series of carriages each having a pair of wheels so that the tubing can be moved about the standpipe. The tractor is driven in a circle about the standpipe. There is no provision for providing a tension on the pipe so that considerable bending of the tubing occurs due to rolling resistance of the supporting carriages. As a result the Van Den Brink system must use heavy and expensive tubing or limit the tubing to short lengths to prevent damage to the tubing. The Van Den Brink system of irrigation also requires at least two wheels for each of the supporting carriages.

Other prior art United States patents which disclose rotating sprinkler systems for irrigating generally circular plots of ground include U.S. Pat. Nos. 2,893,643 to Gordon; 3,259,319 to Wallace; 3,448,927 to Blair; 3,608,826 to Reinke; 3,730,211 to de Laine; and 3,672,572 to Delfs.

SUMMARY OF THE INVENTION

The rotary irrigation system of the present invention provides apparatus which can be used to irrigate relatively large areas of land with very little labor once the system has been installed. A vertical pipe, which is connected to a source of water under pressure, is mounted in the center of an area to be irrigated. A length of tubing having a plurality of spaced openings for discharging water has one end pivotally connected to the pipe. A power mover operatively connected to the other end of the tubing causes the tubing to pivotally move around the vertical pipe. Guide means, preferably in the form of a tension member connected to the forward portion of the power mover and at or near the vertical pipe, is provided to guide the power mover in a closed loop path. A plurality of carriages support the tubing above the ground so that it can be easily moved over the ground even though the area may not be perfectly flat. The power mover is connected to the tubing at the outer end thereof and is driven so as to create a driving force in a direction to produce a radially outwardly directed force component on the tubing. The resultant tension produced in the tubing controls and limits the bending of the tubing due to the friction-imposed forces created at the carriage support points.

One of the features of the present invention is the laterally staggered location of the support carriages and the fact that the carriages support the tubing at joints therein wherein the adjacent tubing segments form an angle of less than 180°. The joints are distributed upon opposite sides of the mean center line of the tubing so that good transverse support is obtained to prevent the tubing from overturning without necessitating plural wheel support means at each of the support points.

BRIEF DESCRIPTION OF THE DRAWINGS

FIG. 2 is an enlarged side elevation of a portion of the rotary irrigation system of FIG. 1 with portions thereof being broken away.

FIG. 3 is an enlarged section taken along line 3—3 of FIG. 2 and showing a carriage for supporting the tubing.

DESCRIPTION OF THE PREFERRED EMBODIMENTS

Figure 1:
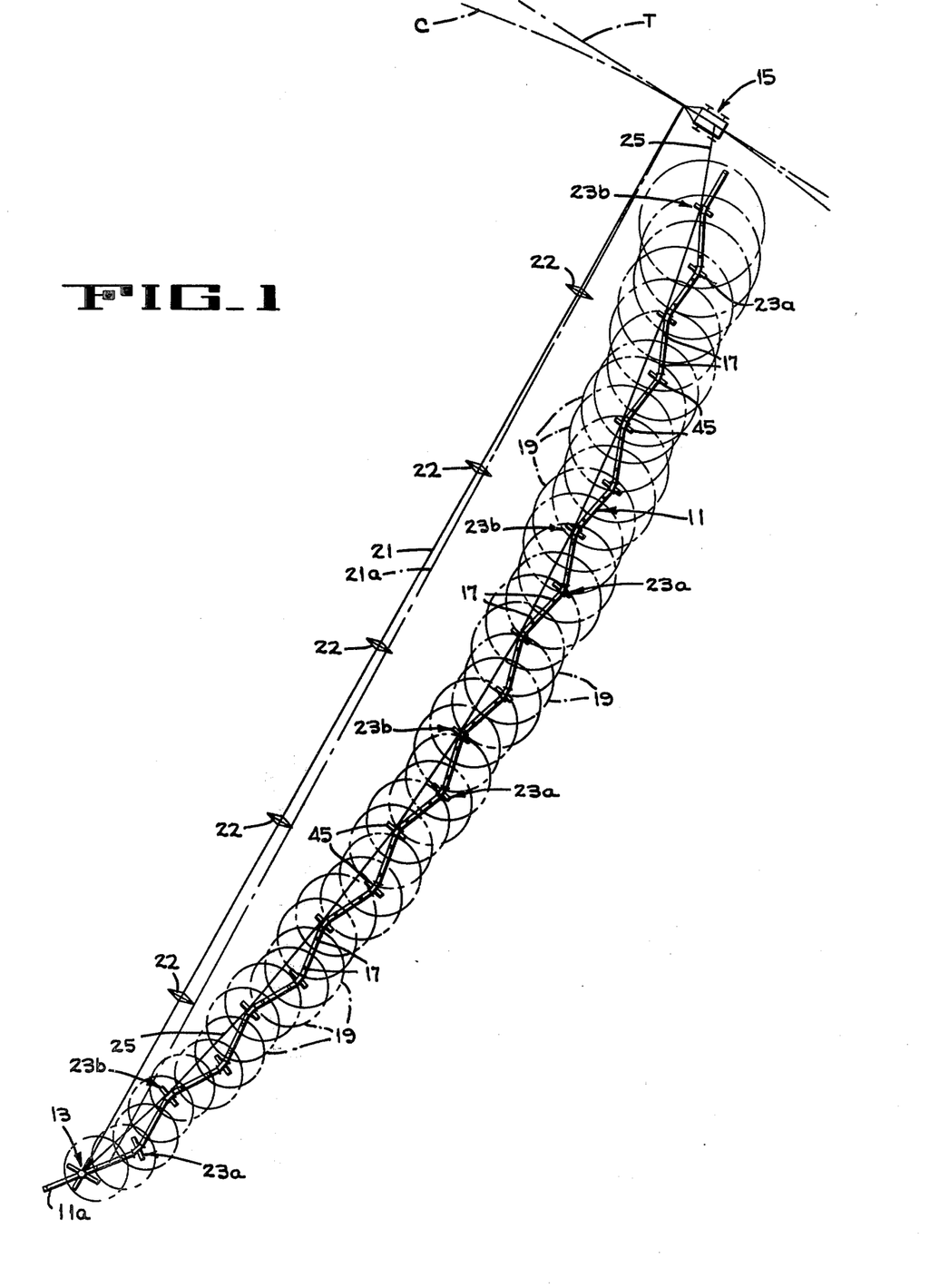
FIG. 1 is a diagrammatic plan view of the rotary irrigation system of the present invention.

Referring more particularly to the drawings, FIG. 1 is a plan view of a rotary irrigation system constructed in accordance with the present invention, such system comprising a long length of pipe or irrigation tubing 11 having one end connected to a center pivot assembly 13 and the other end connected to a power mover 15. The center pivot assembly is arranged to be connected to a source of water and is adapted to direct such water under pressure to the connected length of irrigation tubing which has a plurality of ports or sprinkler openings spaced along the length thereof each of which receives a sprinkler head 17 which disperses water over an area that is indicated roughly by one of a plurality of circles 19 on FIG. 1. A radius control cable 21, anchored at one end to the pivot assembly 13 and connected at the other end to the power mover 15, causes the power mover to move in a generally circular path around the pivot assembly. The control cable 21 may, alternatively, be connected to the tubing at a distance from the pivot assembly as shown by an alternate cable 21a (in FIG. 1) although for better control the control cable should be connected to or near to the center pivot assembly.

Figures 4, 5:
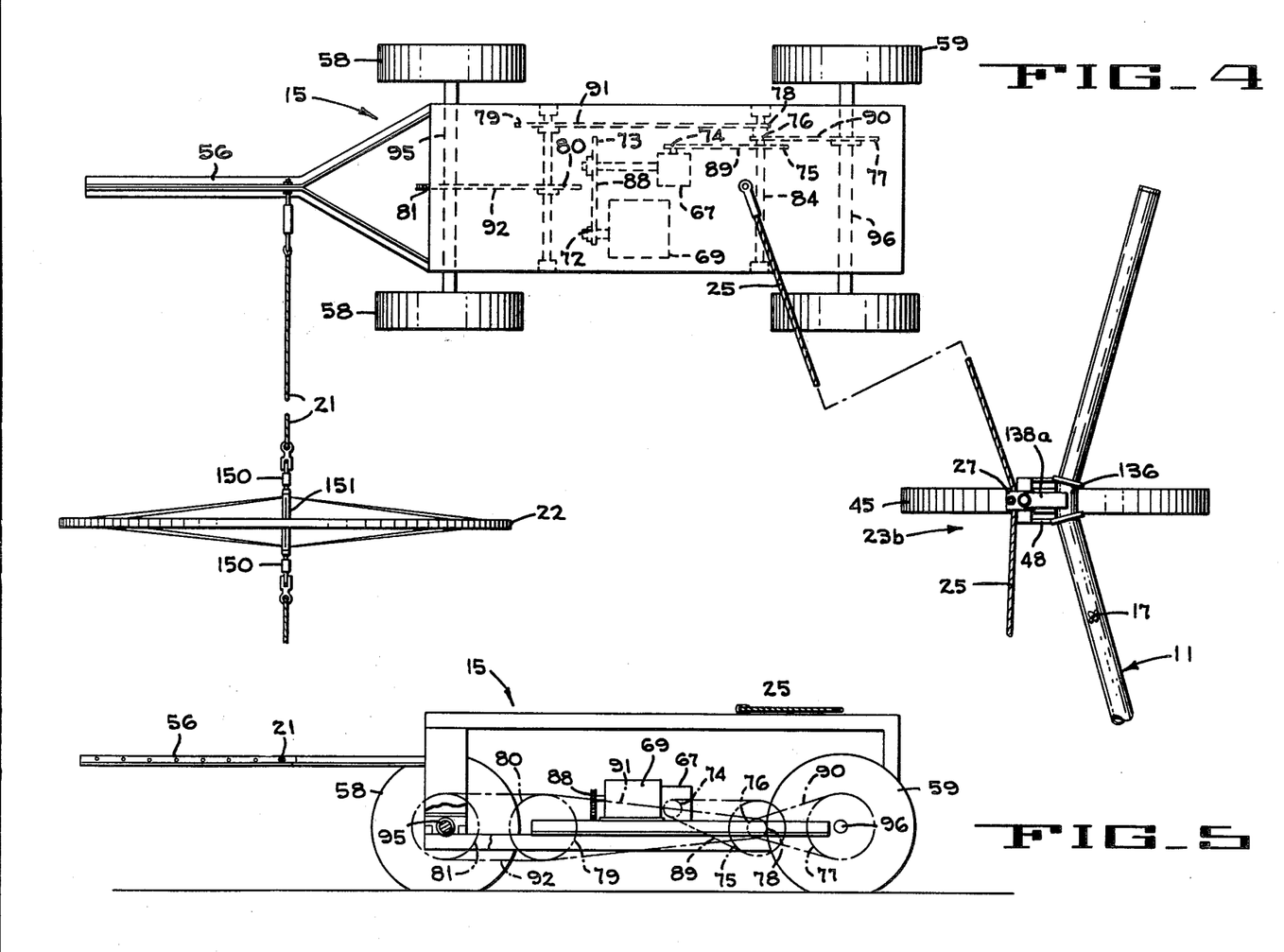
FIG. 4 is a plan view of the power mover of the present invention particularly showing the manner of connecting the power mover to the control cable at the outer end of the irrigation tubing.
FIG. 5 is a side elevation of the power mover of FIG. 4.

The length of tubing 11 is connected to and supported by a plurality of wheeled carriage assemblies 23a and 23b (FIG. 1) which support the tubing at an elevation above the ground suitable to clear the type of crop being irrigated. A tow cable 25, best shown in FIG. 4, is connected between the power mover 15 and the tubing to pull the tubing over the area being irrigated.

The rolling resistance between the ground and the wheels on the carriage assemblies produces a drag on the assemblies which causes the tubing to assume the catenary or bow shape shown in FIG. 1. The tubing, which is formed of individual sections of suitable length flanged together, may be made of thin wall tubing material such as 4 inch OD aluminum tubing having a wall thickness of 0.072 inches. Unless an outward tension producing force is applied to the tubing, the drag on the assemblies could cause such thin-walled irrigation tubing to bend and collapse as this tubing has very little resistance to bending in such long lengths. To prevent this collapse an outwardly directed force is applied to the entire length of tubing 11 by directing the power mover 15 in a direction which is approximately tangential to the circle in which the power mover is actually forced to move by the control cable 21. That is to say, the power mover is driven so as to create a radially outwardly directed force component on the tubing. This attempt to drive the power mover in a direction which is approximately tangent to the actual path of travel provides a tension on both the irrigation tubing and on the control cable. The tension on the tubing reduces the amount of bow and prevents collapse of the tubing while the tension on the control cable aids in keeping the cable above the ground.

The direction in which the power mover is pointed is represented by the substantially tangential line "T" of FIG. 1. The radius control cable 21 pulls on the front portion of the power mover causing the wheels to skid slightly sideways as the power mover moves forward so that the actual path of the power mover is substantially a circle, a portion of which is shown and labeled "C" in FIG. 1. To provide the outward force on the tubing segments the tow cable 25 is connected at one end to the power mover and, in addition, is connected to the tubing by a plurality of clamps 27 (FIG. 7A) positioned above each of the leading carriage seemblies 23b along the length of the tubing (see FIG. 7).

Since a radially outward force on the irrigation tubing is required, the center pivot assembly 13 is braced against this force as shown in FIG. 2. A plurality of braces 28 are each connected to a corresponding concrete footing 29 which is buried in the ground 31. The lower ends of the braces include flanges 28a that each receive an anchor bolt 33 which is partially buried inside the associated footing. The flanges 28a are each secured to the respective anchor bolts by a nut 34 threaded onto the upper free end of the anchor bolt. The upper end of each of the braces is connected to a clamp 37 which is connected to the upper end of a short section of vertically extending pipe 44. A rotary elbow 39 is connected between the upper end of pipe 44 and the irrigation tubing 11.

Figure 6:
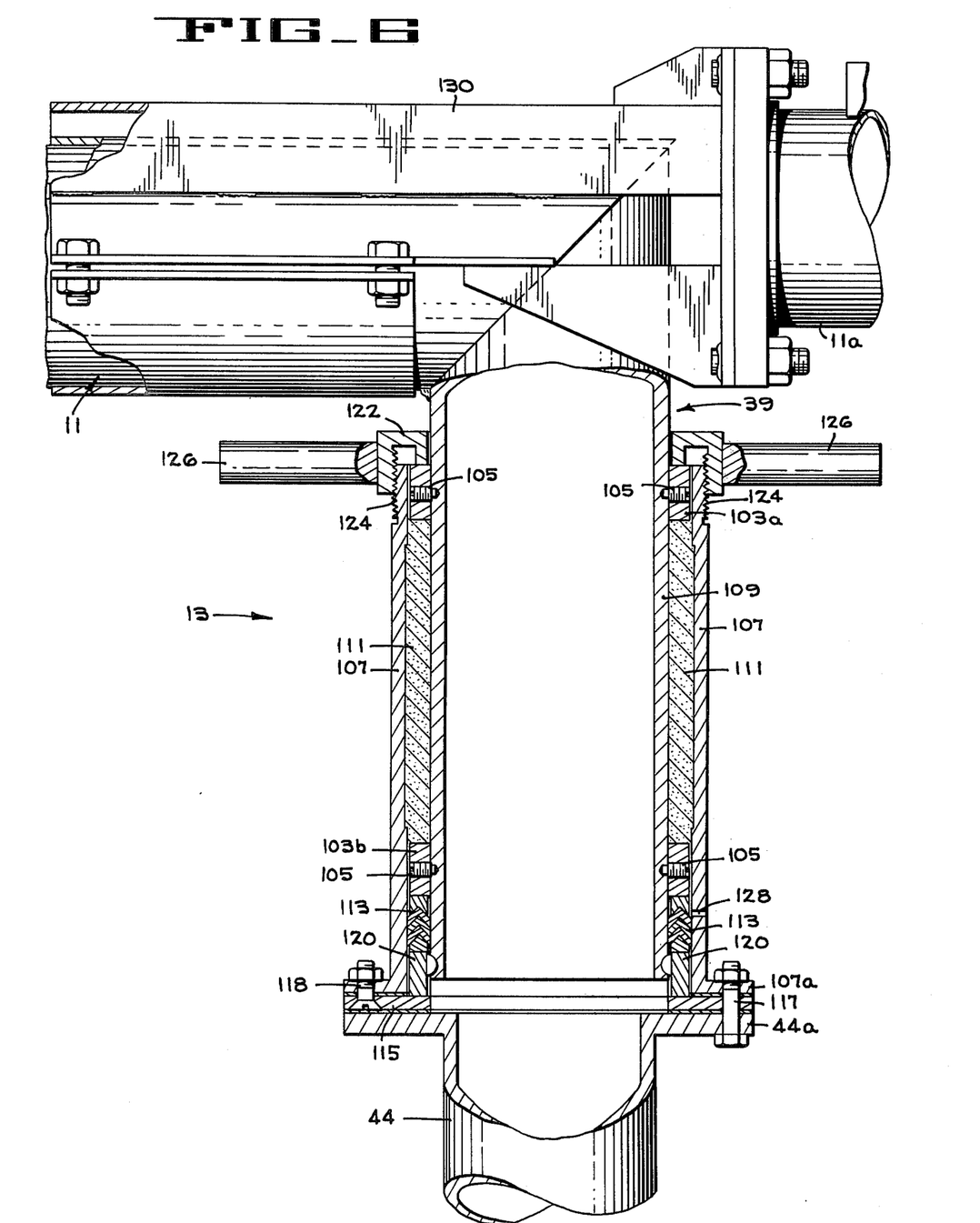
FIG. 6 is a side elevation of the center pivot for the rotary irrigation system with portions thereof being broken away and shown in section.

Details of the rotary elbow 39 are shown in the side elevation and partial section view of FIG. 6. The rotary elbow includes an outer tube 107 and an inner tube 109 with a quantity of waterproof grease 111 packed in a cavity between these tubes and between an upper bearing 103a and a lower bearing 103b. The bearings 103a and 103b are secured to the inner tube 109 by a plurality of set screws 105 so that the bearings 103a and 103b rotate with the inner tube. The bearings 103a and 103b brace the upper horizontal portion 130 of the elbow against the outward tension provided by the power mover. A large nut 122 is secured to the upper end of the outer tube 107 by a plurality of threads 124 on the tube. A pair of handles 126 attached to the nut 122 enable the nut to be tightened by hand against the upper bearing 103a. As the nut 122 is tightened the bearing ring 103a is forced downward so that the inner tube 109 is forced downward. As the inner tube 109 is forced downward the lower bearing 103b forces an annular packing ring 113 against a keyed facing ring 120 thereby compressing the packing ring 113 between rings 103b and 120 and tubes 107 and 109 to provide a water-tight seal. The quality of the seal is checked by observing a bleed hole 128 near the lower portion of the outer tube 107. The nut 122 should be tightened until no water flows from the bleed hole.

The keyed facing ring 120 is mounted against a thrust bearing 115 which is held in position by a plurality of circumferentially spaced bolts 118. The lower end of the outer tube 107 includes a flange 107a which receive the bolts 118 and which is adapted to be separately secured to a flange 44a at the upper end of the short vertical pipe 44 by a plurality of circumferentially spaced bolts 117. Water under pressure is supplied by an underground main line 41 (FIG. 2) through a flexible hose 42 to the short vertical section of pipe 44 and through elbow 39 to the irrigation tubing 11.

A counterbalance section of tubing 11a (FIG. 2) is connected to the rotary elbow 39 on the side opposite the side where the irrigation tubing 11 is connected. This counterbalance section of tubing 11a is used as a counterweight about the center pivot to provide a weight equal to the weight of the tubing 11 which is supported by the center pivot. This reduces the bending stress on the rotary elbow so that the irrigation tubing can be more easily rotated around the center pivot. A bypass tube 43 is connected from the irrigation tubing 11 to the counterweight tubing 11a so that the counterweight tubing 11a will be filled with water whenever water is supplied to the tubing 11 through the pivot assembly 13. This water causes the total weight of the counterweight 11a to be substantially the same as the weight of that portion of the tubing 11 which is supported by the center pivot assembly, i.e., one-half of the weight of a section of tubing between the pivot assembly and the first supporting carriage assembly 23a.

Details of one of the carriage assemblies 23a and 23b are shown in a front elevation view at the left of FIG. 2 and in the side elevation view of FIG. 3. A large support wheel 45 is connected to the carriage assembly so that the irrigation tubing 11 is supported above the ground. The wheel 45 is rotatably mounted in a fork 48 connected to a spindle 51 which is mounted so that it is free to rotate about a vertical axis in a bearing 54. The fork 48 is shaped so that the drag provided by the wheel causes the lower portion of the fork 48 to trail behind the upper portion of the fork. This combination of spindle 51, bearing 54 and fork 48 provides a caster mounting so that the fork 48 is free to rotate to keep the wheel 45 aligned in the direction that the carriage is being moved across the field. If necessary, the rotation of the wheel 45 can be restricted by placing restraints on the coaster mounting (not shown) to prevent excessive swinging when the wheel strikes an obstacle.

Figures 9, 10, 11:
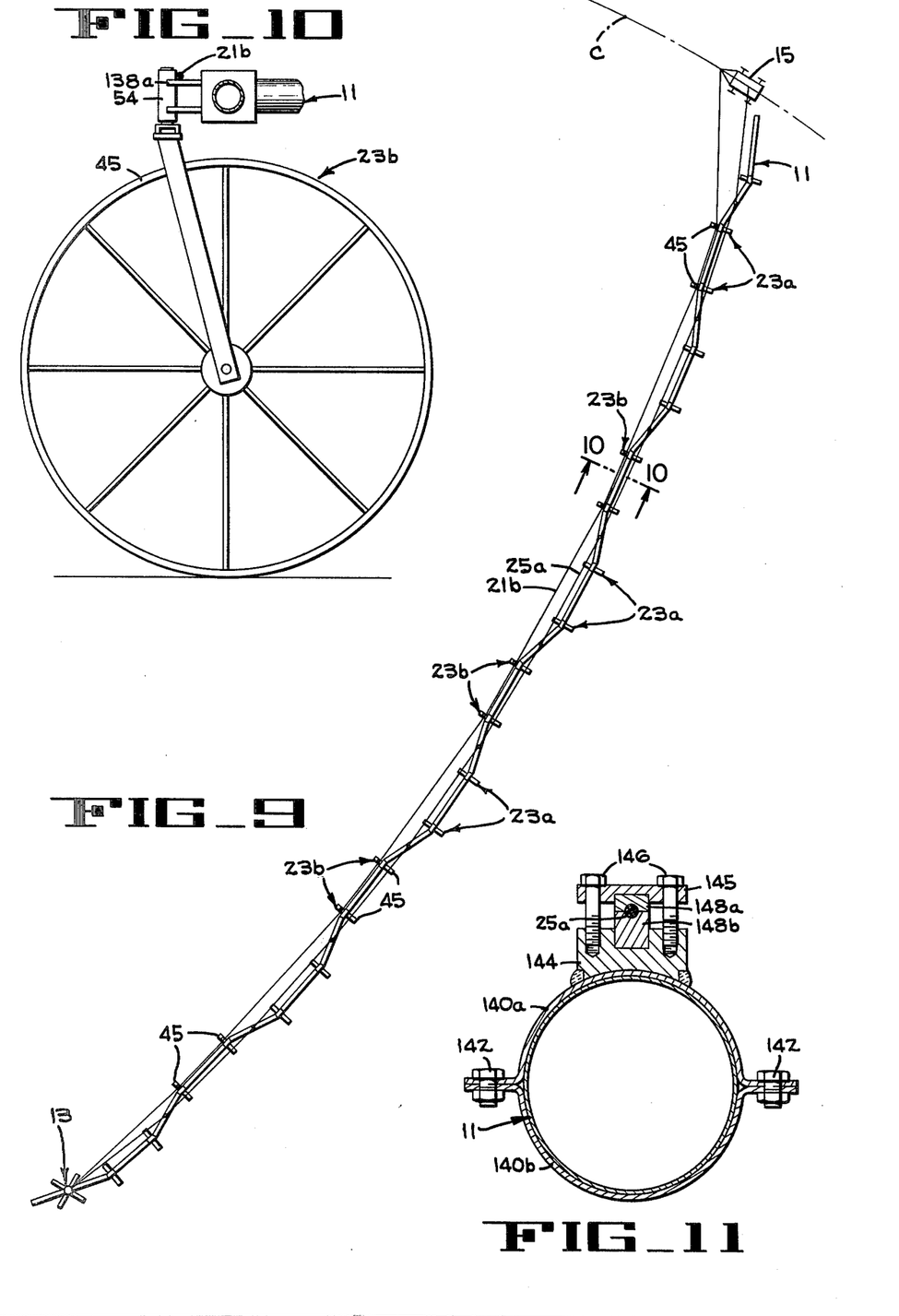
FIG. 9 discloses another alternate embodiment of the invention having a different arrangement of the tubing sections and a different arrangement for the radius control cable.
FIG. 10 is an enlarged section taken on line 10—10 of FIG. 9.
FIG. 11 is an enlarged vertical section taken through one of the connections of the tow cable to a tubing section in the system of FIG. 9.

The irrigation tubing 11 is formed by a plurality of short tubing sections connected in a generally staggered, or sawtooth, shape with the sawtooth pattern lying in a generally horizontal plane as shown in the plan view of FIG. 1. A plurality of carriages 23a mounted at the extreme rearward joints of the tubing (along with the rearward portion of the tubing and the water therein) provide enough weight so that the tubing will not tip in a forward direction as the tubing is pulled across a field. A plurality of carriages 23b mounted at the extreme front joints of the tubing provide weight to prevent the tubing from tipping in a backward direction. Although the system shown is preferred, the tubing may be formed in other laterally offset shapes in which the front carriages are each mounted several feet ahead of the adjacent rear carriages so that the system will be stable and will not tip over. One such alternate system is shown in FIG. 9 and will be explained in detail hereinafter.

Figure 7:
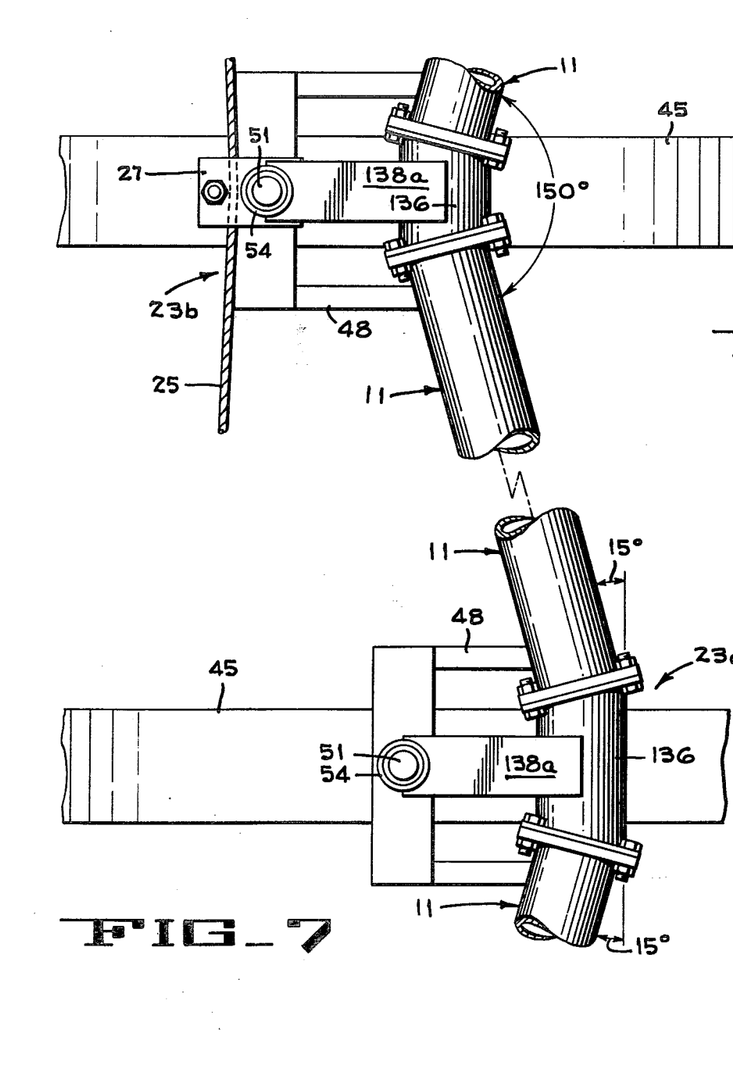
FIG. 7 discloses, in plan, details of the carriage mountings for the tubing.

Details of the carriage mountings are shown in FIGS. 3 and 7. A front coupling pipe 136 (FIG. 7) is connected between two adjacent sections of tubing 11 with the coupling pipe being designed to produce an angle of approximately 150 degrees between the two adjacent sections of tubing 11, as shown in FIG. 7. A pair of brackets 138a and 138b (FIG. 3) mounted between the coupling pipe 136 and the bearing 54 connect the carriage 23a or 23b to the tubing.

FIG. 4 shows a plan view of the power mover 15 and the connection of the cables 21 and 25 to the power mover. As stated hereinbefore, the wheels of the power mover are pointed in a direction that would cause the mover to travel on a line which is approximately tangent to the circle C (FIG. 1) if the cables were not attached to the mover. In the embodiment shown the wheels 58, 59 are mounted on fixed axles 95, 96 with the front wheels 58 pointing substantially straight ahead. The radius control cable 21 is connected to the tongue 56 of the power mover and causes the front wheels 58 of the power mover to slide slightly sideways over the ground as the mover goes forward so that the power mover travels in a circle around the area being irrigated—as shown in FIG. 1. The tow cable 25 which provides tension on the tubing and pulls the tubing in a circle around the center pivot is connected between the power mover 15 spaced points along the tubing. The length of the cable between the power mover 15 and the end of the tubing nearest the power mover should be long enough so that the power mover will be ahead of the area being irrigated. This enables the power mover to travel over relatively dry ground so that traction between its wheels 58, 59 and the ground is increased. Keeping water from falling on the power mover also promotes better performance and longer life from the power mover.

Power for the power mover 15 is provided to the wheels 58 and 59 of the mover by a small motor 69 and by a gear reduction system shown in FIGS. 4 and 5 so that the tubing will travel at a very slow speed about the field to permit a thorough soaking of the ground. If desired, power may be applied to only one pair of wheels. In the embodiment shown, power is coupled from the motor 69 to a speed reducer 67 by a pair of sprockets 72 and 73 and a roller chain 88. The speed reducer 67 provides a speed reduction of approximately 2000 to 1. A further reduction in speed is provided by a pair of sprockets 74 and 75 and a roller chain 89 which connect the output of the speed reducer 67 to a drive shaft 84. Power is coupled to the rear axle 96 of the power mover from drive shaft 84 by a pair of sprockets 76 and 77 and a roller chain 90. A plurality of sprockets 78–81 and a pair of roller chains 91 and 92 couple power from drive shaft 84 to the front axle 95 so that power is supplied to all four wheels 58, 59 of the power mover.

With any suitable gear reducing system the power mover 15 can be made to travel very slowly around the area being irrigated so that a small gasoline engine or electric motor can be used to power it, or, alternatively, the power mover can be powered by a hydraulic motor using the irrigation water pressure for fluid power. For example, in one typical installation the center pivot assembly 13 is mounted at the center of a square 40 acre field where the power mover makes approximately one revolution around the field every four days powered by a motor having less than 2 horsepower. A simple change of gear ratios on the power mover can be made to cause the mover to travel around the field at different rates. A gas tank can be easily mounted on the chassis of the mover with the capacity for enough gasoline to power the low horsepower motor for more than 24 hours. Thus, the gas tank may be filled once a day, the motor started, the water supplied to the tubing, and the system allowed to operate for a full day without any further attention. When an electric motor is used, the system can obviously operate for a much longer period of time without any attention.

The control cable 21 is supported above the ground surface by a plurality of spaced lightweight wheels 22. As shown in FIG. 4, each wheel 22 interconnects spaced segments of the cable 21 by means of swivel joint connections 150 at the opposed ends of the wheel axle 151. Alternatively, the control cable 21 may be supported above the ground by the forwardly positioned carriages 23b, i.e., like the tow cable 25. However, unlike the tow cable 25 which is securely attached to the tubing at the support points, the control cable will comprise one continuous cable and will be loosely received over the upper bracket 138a against the upright bearing 54 (see FIG. 10) so that the pull is directly between the center pivot and the power mover.

The size and spacing of the openings in the tubing can be varied to account for the difference in water pressure along the length of the tubing and for the difference in areas to be covered at different distances from the central pivot point. The water pressure is higher near the pivot point and decreases as the water travels outwardly in the tubing in the direction of the power mover. Also, the amount of area covered per foot of length of tubing is greater near the power mover. In one typical installation 5/64-inch sprinkler heads are used near the center pivot, with the size increasing to 9/32-inch heads near the power mover.

Figures 7A, 8:
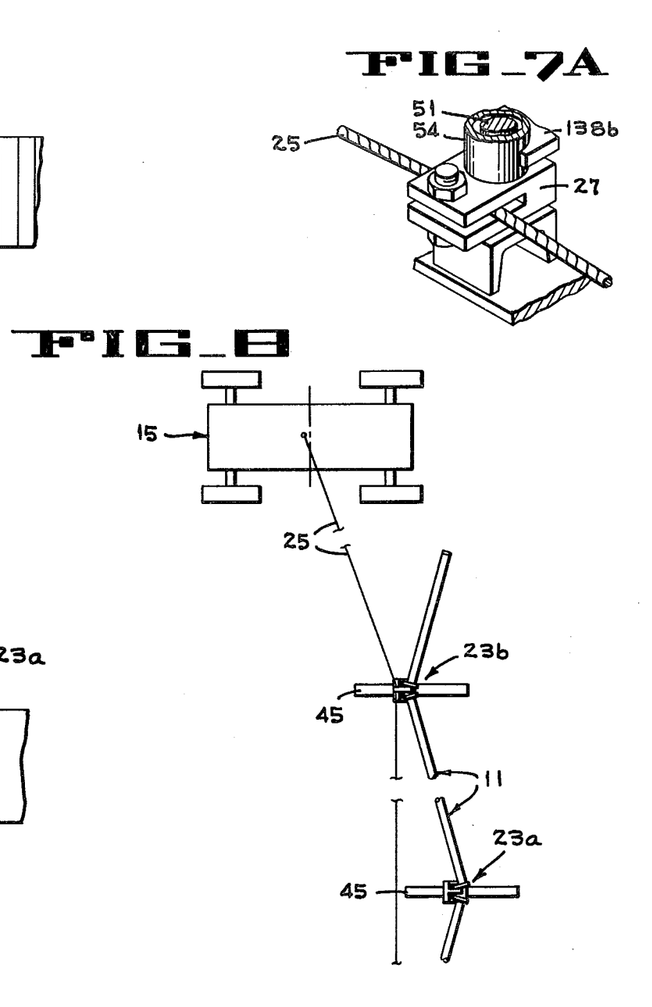
FIG. 7A is an isometric detail view of one of the clamps for securing the tow cable to the tubing.
FIG. 8 discloses an alternate embodiment of the invention which does not utilize a control cable.

Another embodiment of the present invention shown in FIG. 8 eliminates the radius control cable 21. Instead, the tow cable 25 is connected to the power mover 15 at a point ahead of the center of the mover. As the mover travels forward the tension on the tow cable increases so that the front wheels of the power mover skid sideways causing the power mover to travel in a generally circular path.

A further embodiment of the present invention is shown in FIGS. 9, 10 and 11. As illustrated in FIG. 9, a long length of tubing 11 is connected at one end to a central pivot assembly 13 and at the other end to a power mover 15, as in the previously described embodiments. Furthermore, the tubing 11 is made up of a plurality of separate segments, or sections, with the joints between the sections being supported by a plurality of wheeled carriage assemblies 23a and 23b. The carriage assemblies, as in the previously described embodiments, are uniformly distributed to the front and to the rear of the mean centerline of the tubing. The tubing sections are arranged, however, so that alternately disposed between each tubing section which crosses over the mean centerline there is a tubing section which extends parallel to such centerline at either the front or rear thereof. It will be understood that the tubing 11 includes a plurality of sprinkler heads (not shown) spaced along the length thereof as in the embodiment of FIG. 1.

It will further be noted that the tow cable (here given the reference numeral 25a) extends along the approximate mean centerline of the tubing 11 where it is rigidly connected to the tubing sections. The control cable (here given reference numeral 21b) is attached at one end to the pivot assembly 13 and at the other end to the leading end of the power mover 15; however, rather than extending radially from the pivot assembly to the power mover, the control cable is received over and supported by the carriage assemblies 23b which are forward of the mean centerline of the tubing. This latter supportive arrangement is shown in FIG. 10 where it will be seen that the control cable 21b is loosely received atop the upper bracket 138a of the carriage assembly so that it pulls against the trailing face of the upright bearing member 54. The control cable is, of course, free to move relative to the supporting carriage assemblies 23b and is not clamped to the tubing 11 as is the tow cable 25a. With this arrangement, special support means (such as wheels 22 of the FIG. 1 embodiment) are not required to support the control cable, and yet the control cable, by being strung directly between the power mover and the pivot assembly, still manages to direct the power mover in its circular path of travel C.

The means whereby the tow cable 25a is clamped to the individual tubing sections which cross over the mean centerline of the tubing is shown in detail in FIG. 11. Thus, it will be noted that a pair of semi-cylindrical brackets 140a, 140b are clamped to the tubing by means of bolts 142. Welded to the upper bracket 140a is a mounting block 144. A second, opposed mounting block 145 is attached to the block 144 by means of bolts 146 to clamp between the mounting blocks a pair of cylindrically shaped bearing members 148a and 148b which, in turn, securely clamp the tow cable 25a therebetween. Thus, the bearing members 148a and 148b are free to swivel within their recesses in the mounting blocks 144 and 145 to permit the tow cable 25a to maintain an effective pulling force on the tubing at the connection point; however, when the bolts 146 are clamped down tightly, the tow cable is securely held so that it cannot be pulled longitudinally through the bearing blocks.

As an alternative to the control cables 21, 21a and 21b, a conventional magnetic buried line system may be used to steer the power mover 15 in a closed loop path which may not necessarily be circular. For example, such steering systems are typically used to cause a length of tubing (comprised of a plurality of interconnected tubing sections) to irrigate a generally square or rectangular plot of ground by steering the power mover in an elliptical or oval path. Thus, the amount of bow in the length of tubing can be decreased to increase the radius about which the power mover is momentarily driven to permit the tubing to be elongated in the radial direction as the power mover approaches the corners of the field to be irrigated.

From the foregoing description it can be seen that the rotary irrigation system of the present invention can be used to irrigate relatively large areas of land with a minimum of labor costs. The single power mover located at or near the outer end of the length of tubing moves the tubing around a center pivot assembly without any need to coordinate the speed of a plurality of power movers as in most of the prior art rotary sprinkling systems. The power mover also provides a radially outwardly directed force on the outer end of the tubing to prevent the tubing from bending to a point of failure. The irrigation system of the present invention can operate continuously for relatively long periods of time without the necessity for adjustments or other attention by an operator.

Although the best modes contemplated for carrying out the present invention have been herein shown and described, it will be apparent that modification and variation may be made without departing from what is regarded to be the subject matter of the invention.

What I claim is:

1. A rotary irrigation system for connection to a source of water for irrigating a relatively large area of land, said source being located at the center of the area to be irrigated, said system comprising:
   a vertical pipe for connection to said source;
   a length of tubing for carrying water, said tubing having a plurality of spaced openings for discharging water along the length of said tubing, one end of said tubing being pivotally connected to said vertical pipe, said pipe having means for coupling water from said source to said tubing, said tubing being formed by a plurality of connected segments with said segments being rigidly interconnected at joints so that adjacent segments define an angle of less than 180° and whereby said joints are placed in a staggered relationship distributed at opposite sides of the mean horizontal center line of the tubing;
   a plurality of carriages, each of said carriages including a single support wheel, said carriages being connected to said tubing at said joints along the length of said tubing to support said tubing above the ground; and
   a power mover operatively connected to the other end of said tubing to pivotally move said tubing in a path around said vertical pipe.

2. A rotary irrigation system as defined in claim 1 including means for causing said power mover to create a driving force in a direction so as to produce a radially outwardly directed force component on said tubing at the outer end thereof.

3. A rotary irrigation system as defined in claim 2 wherein the means for moving the tubing includes tension means connected between said power mover and a plurality of points along the length of said tubing.

4. A rotary irrigation system as defined in claim 3 wherein said tension means is rigidly connected to said tubing at said joints which are displaced forwardly of said mean horizontal center line of the tubing.

5. A rotary irrigation system as defined in claim 3 wherein said tension means is rigidly connected to said tubing along said mean horizontal center line of the tubing.

6. A rotary irrigation system as defined in claim 1 including a tension member connected to said power mover and extending inwardly therefrom to said vertical pipe to cause said power mover to travel in a generally circular path around said vertical pipe.

7. A rotary irrigation system as defined in claim 1 wherein each of said support wheels has a caster mounting between said support wheel and its associated carriage.

8. A rotary irrigation system as defined in claim 1 including means for connecting said power mover to said tubing so that the power mover travels ahead of the area being irrigated.

9. A rotary irrigation system as defined in claim 1 wherein said power mover includes a frame, a motor supported on said frame, at least one front wheel, a pair of rear wheels, and means for coupling power from said motor to each of said rear wheels.

10. A rotary irrigation system for connection to a source of water for irrigating a relatively large area of land, said source being located at the center of the area to be irrigated, said system comprising:
    a vertical pipe for connection to said source;
    a length of tubing for carrying water including a plurality of sections along the length thereof alternately inclined in opposite directions with respect to the mean centerline of said tubing, said tubing having a plurality of spaced openings for discharging water along the length of said tubing, one end of said tubing being pivotally connected to said vertical pipe, said pipe having means for coupling water from said source to said tubing;
    a plurality of carriage assemblies, said assemblies being connected to said tubing at spaced intervals along the length of said tubing to support said tubing above the ground;
    a power mover operatively connected at the rearward portion thereof to the other end of said tubing to pivotally move said tubing in a generally circular path around said vertical pipe, said power mover including a frame,
    a tension member separate from said length of tubing fixedly connected at one end thereof to the forward end of said power mover and being operatively connected at the other end thereof in a fixed manner to said vertical pipe, said tension member extending directly between said power mover and said vertical pipe generally along said length of tubing without any fixed connection between said vertical pipe and said power mover for maintaining a fixed distance therebetween to guide said power mover in a generally circular path about said pipe, said tension member being solely supported between said power mover and vertical pipe in a loose manner by certain of said carriage assemblies; and
    means for causing said power mover to create a driving force in a direction so as to produce a radially outwardly directed force component on said tubing at the outer end thereof; said last named means including a front wheel assembly and a rear wheel assembly with each assembly including at least one wheel, power means for driving at least one of said wheel assemblies, and means for securing each of the wheels of said power mover to the frame of said power mover so as to prevent relative pivotal movement thereof with respect to the frame.

11. A rotary irrigation system as defined in claim 10 wherein each carriage assembly includes only a single support wheel, and means for mounting said wheels in a staggered relationship relative to said tubing with said wheels being distributed ahead of the mean horizontal position of the adjacent tubing and behind the mean horizontal position of the adjacent tubing, said carriage assemblies which are ahead of the mean horizontal position of the tubing providing the loose support for said tension member.

12. A rotary irrigation system for connection to a source of water for irrigating a relatively large area of land, said source being located at the center of the area to be irrigated, said system comprising:

a length of tubing for carrying water, said tubing being comprised of a plurality of pipe sections connected rigidly together in an end-to-end arrangement, said tubing having a plurality of spaced openings along the length thereof for discharging water;

a vertical pipe for connection to said source, one end of said tubing being pivotally connected to said vertical pipe;

a carriage assembly connected to support said tubing above the ground, said carriage assembly including a plurality of support wheels for supporting said tubing, said support wheels being spaced along the length of said tubing for directly supporting substantially all of said tubing sections;

a single cable rigidly operatively connected at a plurality of intermediate locations thereon to substantially all of said sections of said tubing;

a power mover operatively connected to one end of said cable to pivotally move said tubing in a generally circular path around said pipe, said power mover including a frame; and means for causing said power mover to create a driving force in a direction so as to produce a radially outwardly directed force component on said tubing at the outer end thereof; said last named means including a front wheel assembly and a rear wheel assembly with each assembly including at least one wheel, power means for driving at least one of said wheel assemblies, and means for securing each of the wheels of said power mover to the frame of said power mover so as to prevent relative pivotal movement thereof with respect to the frame.

13. A rotary irrigation system as defined in claim 12 wherein the length of cable that is connected directly between said tubing and said power mover is of sufficient length so that the power mover travels circumferentially forwardly of the area being irrigated.

* * * * *